(12) United States Patent
Kellner et al.

(10) Patent No.: US 11,752,852 B2
(45) Date of Patent: Sep. 12, 2023

(54) TRACTION BATTERY MODULE

(71) Applicant: Dr. Ing. h.c. F. Porsche Aktiengesellschaft, Stuttgart (DE)

(72) Inventors: Philipp Kellner, Renningen (DE); Dieter Schiebel, Korntal-Münchingen (DE); Immanuel Vogel, Kornwestheim (DE); Sascha Mostofi, Zeltingen (DE); Christopher Volkmer, Niefern-Öschelbronn (DE); Adrian Starczewski, Korntal-Münchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 78 days.

(21) Appl. No.: 17/500,049

(22) Filed: Oct. 13, 2021

(65) Prior Publication Data
US 2022/0126667 A1 Apr. 28, 2022

(30) Foreign Application Priority Data
Oct. 27, 2020 (DE) ...................... 10 2020 128 168.4

(51) Int. Cl.
*B60K 1/04* (2019.01)
*H01M 50/209* (2021.01)
(Continued)

(52) U.S. Cl.
CPC ............ *B60K 1/04* (2013.01); *H01M 50/209* (2021.01); *H01M 50/244* (2021.01); *H01M 50/507* (2021.01); *H01M 2220/20* (2013.01)

(58) Field of Classification Search
CPC .... B60K 1/04; H01M 10/655; H01M 50/209; H01M 50/244; H01M 10/613; H01M 50/249; H01M 50/264
See application file for complete search history.

(56) References Cited

U.S. PATENT DOCUMENTS

| 10,622,606 B2 | 4/2020 | Keller et al. |
| 2010/0151308 A1* | 6/2010 | Hermann ............ H01M 50/249 |
| | | 429/120 |

(Continued)

FOREIGN PATENT DOCUMENTS

| CN | 209312824 U | 8/2019 |
| DE | 102014108803 A1 | 12/2015 |

(Continued)

OTHER PUBLICATIONS

Great Britain Combined Search and Examination Report for Application No. GB2115149.3, dated Apr. 13, 2022, 2 pages.

*Primary Examiner* — Jason D Shanske
*Assistant Examiner* — James J Triggs
(74) *Attorney, Agent, or Firm* — RatnerPrestia

(57) ABSTRACT

A traction battery module has a housing body having four side walls and two end walls, and a plurality of cell elements which are arranged in the housing body, are arranged parallel to one another and parallel to two of the four side walls and are combined to form a cell element stack. A respective holding frame is positioned at the two end-side longitudinal ends of the cell element stack, on which holding frame the longitudinal ends of the cell elements are held such that the cell element stack is spaced apart in all four transverse directions from the four side walls. Each holding frame has a spring arrangement on its spring side facing a side wall and does not have a spring arrangement on its fixed side opposite the spring side. The holding frame is pressed by the spring arrangement onto the side wall assigned to the fixed side.

13 Claims, 3 Drawing Sheets

(51) Int. Cl.
*H01M 50/507* (2021.01)
*H01M 50/244* (2021.01)

(56) References Cited

U.S. PATENT DOCUMENTS

2018/0294451 A1* 10/2018 Oechsle .............. H01M 50/289
2020/0020900 A1 1/2020 Kellner et al.

FOREIGN PATENT DOCUMENTS

| DE | 102018201632 A1 | 8/2019 |
| DE | 102018126572 A1 | 4/2020 |
| DE | 102019202132 A1 | 8/2020 |
| EP | 3582290 A1 | 12/2019 |
| WO | 2016135969 A1 | 9/2016 |

* cited by examiner

TRACTION BATTERY MODULE

CROSS-REFERENCE TO RELATED APPLICATION

This application claims priority to German Patent Application No. 10 2020 128 168.4, filed Oct. 27, 2020, the content of such application being incorporated by reference herein in its entirety.

FIELD OF THE INVENTION

The invention relates to an electric motor vehicle traction battery module having a housing body which is substantially rectangular in cross section and is formed by four side walls and two end walls, and a plurality of plate-like battery cell elements which are arranged in the housing body and are combined to form a cell element stack.

BACKGROUND OF THE INVENTION

For the manufacturing of an electric HV traction battery module, use is made, for the housing body, of, for example, a metal extrusion profile which forms the four side walls and into which the cell element stack is pushed from an open end side for its installation. For a good thermal connection of the cell element stack to a housing side wall that is cooled in the installed state, a heat conducting mass is introduced which thermally connects, for example, the lower side of the cell element stack to the adjacent side wall.

Extrusion profiles have relatively large manufacturing tolerances, and therefore the cell element stack has to be smaller at least by the manufacturing tolerance than the smallest possible internal dimensions of the extrusion profile. These circumstances make it necessary to secure the cell element stack within the housing in a tolerance-compensating manner with respect to one or more spatial axes, for example with the aid of elastic spring elements.

Traction battery modules of this type are known, for example, from DE 10 2014 108 803 A1, DE 10 2018 201 632 A1 or DE 10 2018 126 572 A1, which are each incorporated by reference herein. However, the installation is sometimes awkward and, during the installation, an undefined spatial positioning of the cell element stack within the housing arises. In the event of relatively large distances between the housing side wall, that is cooled in the state installed in the vehicle, and the cell element stack, this leads to a relatively high requirement for heat conducting mass in order to reliably ensure a sufficient thermal connection of the cell element stack to the cooled side wall.

SUMMARY OF THE INVENTION

Described herein is a traction battery module which can be produced cost-effectively.

The traction battery module, according to aspects of the invention, has a housing body which is substantially rectangular in cross section and has four side walls and two end walls. The four side walls can be formed, for example, by a monolithic profile body, for example by a metal profile body which is produced by extrusion and, during the production of the traction battery module, is closed by connecting the two end walls to form a hermetically closed housing. A plurality of plate-like battery cell elements are arranged in the housing body, which battery cell elements are arranged parallel to one another and parallel to two side walls, and which are combined electrically and mechanically to form a cell element stack. A respective separate holding frame is provided at the two end-side longitudinal ends of the cell element stack, on which holding frame the longitudinal ends of the cell elements are in each case mechanically held in such a manner that they are mechanically combined, and that the cell element stack is at least minimally spaced apart in all four transverse directions from the corresponding side walls of the housing.

Each holding frame has an elastic spring arrangement on its spring side facing a side wall, and does not have a spring arrangement on its fixed side opposite the spring side, and therefore the holding frame is pressed by the spring arrangement onto the inner side of the side wall of the housing, the inner side facing the fixed side. As a rule, the side wall forming the fixed side is the lower side wall of the housing body and the spring side is the upper side wall of the housing body. The holding frame therefore mechanically holds together all the cell elements of a cell element stack and ensures an at least minimum spatial distance of the cell element stack from all the side walls and end walls of the housing body. On the spring side, however, the cell element stack is not spaced apart from the corresponding side wall by a rigid spacer element, but rather by an elastic spring arrangement, and therefore tolerances are thereby compensated for on the spring side of the cell element stack. By contrast, on the fixed side, the same distance of the cell element stack from the associated side wall is always ensured.

In this way, a relatively small distance of the cell element stack from the relevant side wall can be reliably set on the fixed side. The relatively small distance of the cell element stack from the relevant side wall, that is cooled in the state installed in the vehicle, ensures a good transfer of heat irrespective of the type of thermal connection between the cell element stack and the associated cooled side wall.

The intermediate space between the cell element stack and the fixed-side side wall is preferably filled by a heat conducting means (e.g., thermal paste, a thermal pad, a conductor plate, a heat sink, a TEC cooler, a fluid medium, etc.). Since the defined distance of the cell element stack from the fixed-side side wall is always of an identically small size, a relatively low amount of heat conducting mass is sufficient to reliably produce a reliable, full thermal connection of the cell element stack to the relevant side wall.

The fixed side of the two holding frames is preferably at the bottom, and therefore the lower side wall belongs to the fixed side, and the spring side is at the top, and therefore the upper side wall belongs to the spring side. In the state installed in the vehicle, the lower side wall of the housing body is cooled, for example, by liquid cooling.

The plate-like cell elements each preferably stand in a vertical plane, specifically both during the production and installation of the traction battery module and in the state installed in the vehicle.

It is particularly preferably provided that the two spring arrangements of the two end-side holding frames each have an insertion bevel which is effective in a single longitudinal direction, namely the installation direction, wherein the two insertion bevels have the same orientation in the longitudinal direction. During the assembly of the traction battery module, the cell element stack including the two holding frames already mounted thereon is pushed in a longitudinal direction into the profile body which is still open on one end side or on both end sides. During the pushing-in operation, the two spring arrangements of the two holding frames are deflected here successively in the transverse direction at the opening edge until the relevant spring arrangement has in each case been fully pushed in. This greatly simplifies the installation of the cell element stack, including the holding frames fastened thereto, in the housing.

The spring arrangement preferably consists of a plurality of separate spring elements distributed over the width of the spring side. This ensures a homogeneous transverse force of the spring elements on the holding frames, said transverse force being distributed over the entire spring-side width.

According to a preferred refinement, the two holding frames are composed of plastic, i.e. can be produced relatively inexpensively. The spring arrangement or the spring elements can in principle be composed of a different material than the holding frame itself, but are preferably formed integrally with the plastic holding frame. The production costs for the traction battery module are thereby reduced.

The cell elements preferably have electric contact elements at their longitudinal ends which are held together by the two holding frames. The contact elements of mutually adjacent cell elements are each connected electrically to one another by a busbar. Said busbars are particularly preferably held directly by the holding frame, i.e. do not have to be fixed on the holding frame or the housing body by separate fixing elements.

BRIEF DESCRIPTION OF THE DRAWINGS

An exemplary embodiment of the invention is explained in more detail below with reference to the drawings, in which.

DETAILED DESCRIPTION OF THE INVENTION

Figure 1:
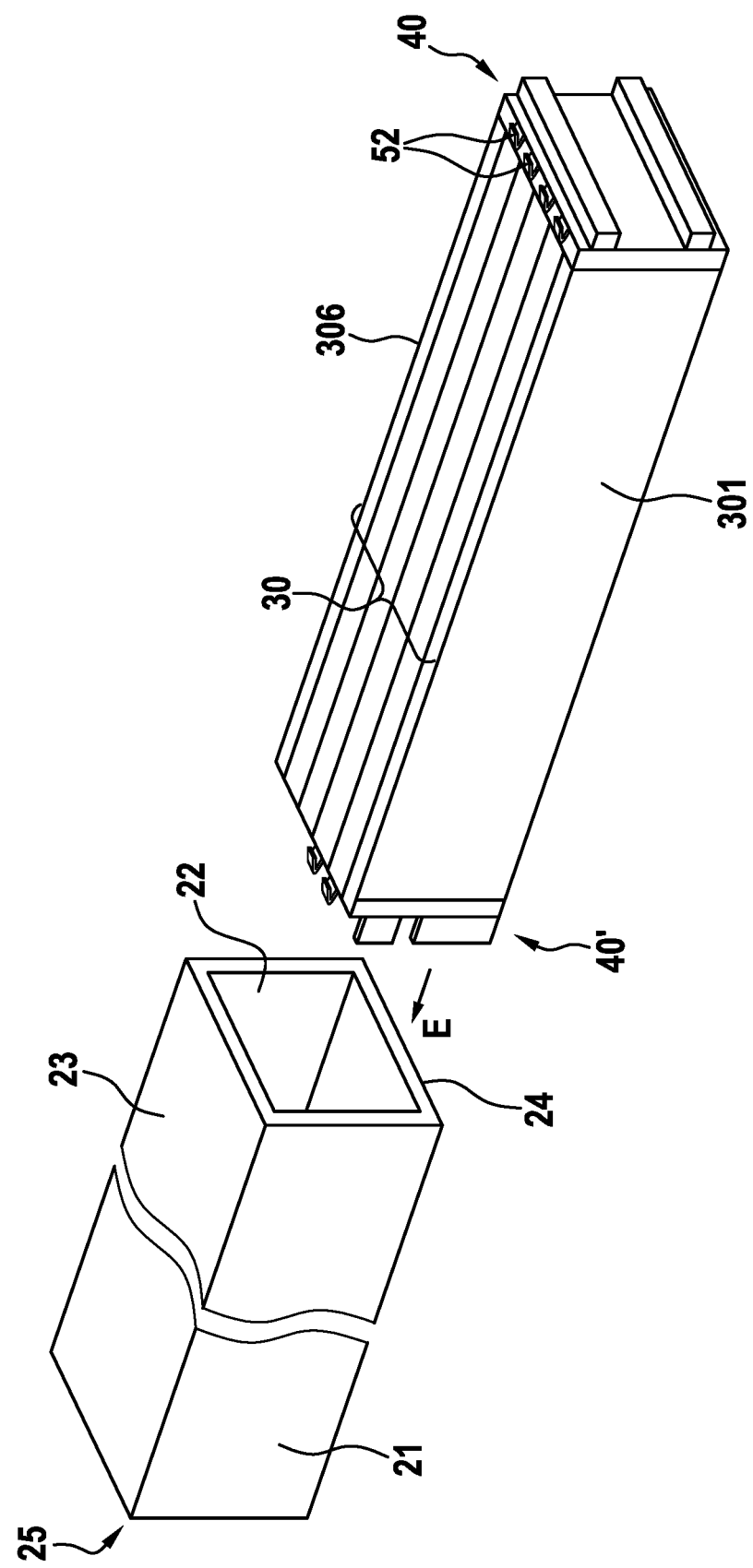
FIG. 1 shows a preassembled cell element stack including holding frames attached to the longitudinal ends and a housing profile body, forming four side walls, prior to the cell element stack being pushed into the profile body.
Figure 2:
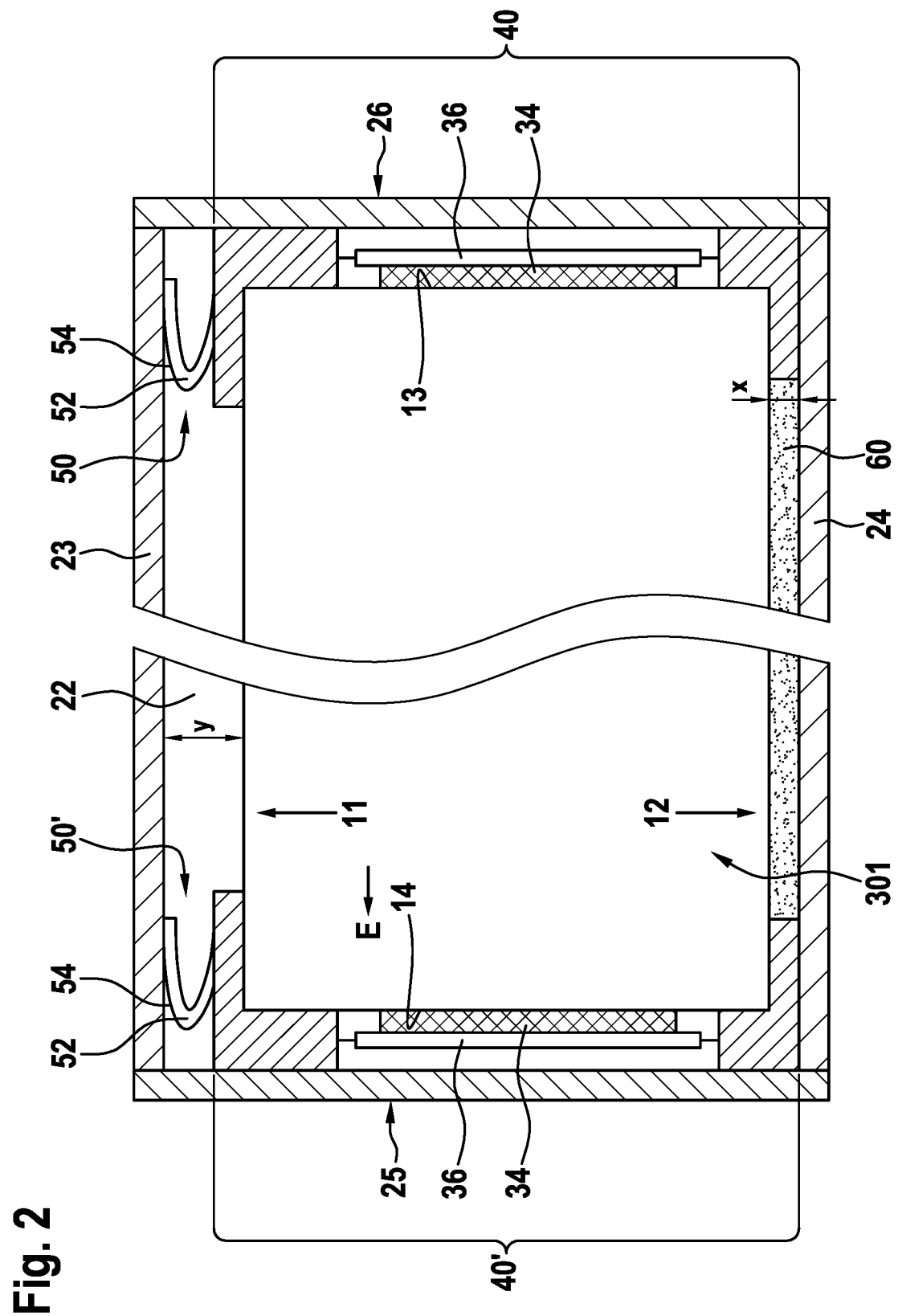
FIG. 2 shows a longitudinal section of an assembled traction battery module, in which the cell element stack has been pushed into the housing body, a heat conducting means has been introduced in the region of the lower housing side wall and the two end walls have been attached.
Figure 3:
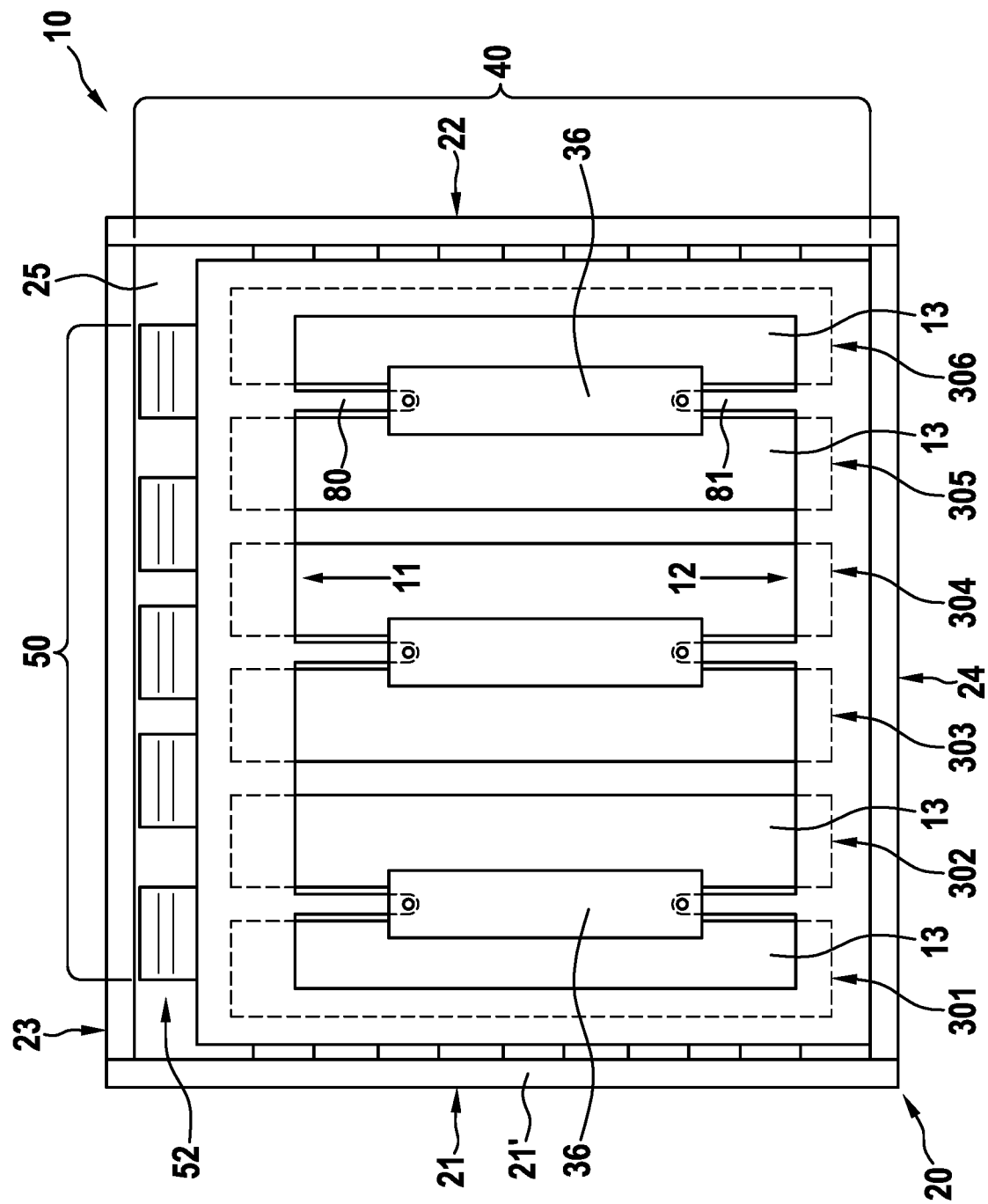
FIG. 3 shows the traction battery module of FIG. 2 in an end view with the end wall open.

FIGS. 2 and 3 schematically illustrate an assembled electric motor vehicle traction battery module 10 having a cuboidal metal housing body 20 and a cell element stack 30 mounted in a gas-tight manner therein. The housing body 20 consists of two vertical side walls 21, 22, two horizontal side walls 23, 24 and two vertical end walls 25, 26 standing perpendicularly to the side walls 21-24. The side walls 21-24 are formed by a monolithic profile body 21' which is illustrated in FIG. 1 and is produced by extrusion.

The cell element stack 30 consists of a multiplicity of plate-like electrochemical cell elements 301-306 which are arranged parallel to one another and in a manner standing in a vertical plane.

A respective plastic holding frame 40, 40' is provided at the two end-side longitudinal ends of the cell element stack 30, said plastic holding frame engaging in a form-fitting manner around the end-side longitudinal ends 13, 14 of the cell elements 301-306 and being combined to form a cuboidal cell element stack 30. As can be seen in FIGS. 2 and 3, the cell elements 301-306 are held and surrounded by the two holding frames 40, 40' in such a manner that the cell element stack 30 is spaced apart in all four transverse directions illustrated in FIG. 3 from the respectively associated side walls 21-24. Each holding frame 40, 40' has a spring arrangement 50 on its spring side 11 facing the upper side wall 23. No spring arrangements are provided on the other three transverse sides facing the side walls 21, 22, 24. The two spring arrangements 50, 50' each consist of a plurality of individual spring elements 52 which are illustrated in FIG. 2, lie in a V-shaped manner, as viewed in the longitudinal section, and each have an insertion bevel 54 which is effective in the pushing-in direction E, i.e. in a longitudinal direction. The spring arrangement 50 and the spring elements 52 are formed integrally with the plastic holding frame 40, 40'.

The insertion bevels 54 of the spring elements 52 of the spring arrangements 50, 50' of the two holding frames 40, 40' have the same orientation in the longitudinal direction such that, when the cell element stack 30 is pushed into the profile body 21', the spring elements 52 deflect proximally in the vertical direction, and therefore the cell element stack 30 is braced vertically at its two longitudinal ends within the four side walls 21-24.

At their longitudinal ends, the cell elements 301-306 have electric contact elements 34 in the form of contact tabs, said contact elements being electrically connected to one another by electrically conductive metal busbars 36, and therefore the cell elements 301-306 are thereby electrically connected in series with one another. The busbars 36 are held in position by plastic holding tongues 80, 81 which are formed integrally with the plastic body of the respective holding frame 40, 40'.

What is claimed is:

1. A traction battery module comprising:
   a housing body which is rectangular in cross section and has four side walls and two end walls,
   a plurality of battery cell elements which are combined to form a cell element stack and are arranged (i) in the housing body, (ii) parallel to one another, and (iii) parallel to two of the four side walls, and
   holding frames which are each respectively positioned at one of two end-side longitudinal ends of the cell element stack, wherein the longitudinal ends of the cell elements are held on the holding frames such that the cell element stack is spaced apart from the four side walls,
   wherein each holding frame has a spring arrangement, a spring side that faces one of the four side walls of the housing body, and a base side that is opposite the spring side,
   wherein, for each holding frame, the spring arrangement is disposed on the spring side and no spring arrangement is disposed on the base side, and
   wherein, for each holding frame, the respective holding frame is pressed by the spring arrangement directly onto a first side wall of the four side walls of the housing body, wherein said first side wall faces said base side of the respective holding frame.

2. The traction battery module as claimed in claim 1, further comprising a heat conductor disposed in an intermediate space between the cell element stack and said first side wall.

3. The traction battery module as claimed in claim 1, wherein the four side walls of the housing body are formed by a monolithic profile body.

4. The traction battery module as claimed in claim 1, wherein said base side is at a bottom end of the respective holding frame and the spring side is at a top end of the respective holding frame.

5. The traction battery module as claimed in claim 1, wherein the battery cell elements each stand in a vertical plane.

6. The traction battery module as claimed in claim 1, wherein the spring arrangements of the holding frames each have an insertion bevel, wherein the two-insertion have the same orientation in a longitudinal direction.

7. The traction battery module as claimed in claim 1, wherein the spring arrangement comprises a plurality of spring elements distributed over the spring side.

8. The traction battery module as claimed in claim 1, wherein the two holding frames are each composed of plastic.

9. The traction battery module as claimed in claim 7, wherein the spring elements are formed integrally with the respective holding frame.

10. The traction battery module as claimed in claim 1, wherein the cell elements have electric contact elements at their longitudinal ends, wherein the electric contact elements of mutually adjacent cell elements are each connected electrically to one another by a busbar.

11. A motor vehicle comprising the traction battery module of claim 1.

12. The traction battery module as claimed in claim 1, wherein one of the holding frames has a wall side extending between the spring side and the base side, wherein the base side is positioned against at least one of the battery cell elements and the first side wall of the four side walls, wherein the wall side is positioned directly against a second side wall of the four side walls, and wherein the spring arrangement is arranged between the spring side and a third side wall of the four side walls.

13. A traction battery module comprising:

a housing body which is rectangular in cross section and has four side walls and two end walls, a plurality of battery cell elements which are combined to form a cell element stack and are arranged (i) in the housing body, (ii) parallel to one another, and (iii) parallel to two of the four side walls, and holding frames which are each respectively positioned at one of two end-side longitudinal ends of the cell element stack, wherein the longitudinal ends of the cell elements are held on the holding frames, wherein each holding frame has a spring arrangement, a spring side that faces one of the four side walls of the housing body, and a base side that is opposite the spring side, wherein, for each holding frame, the spring arrangement is disposed on the spring side and no spring arrangement is disposed on the base side, and wherein, for each holding frame, the respective holding frame is pressed by the spring arrangement onto a first side wall of the four side walls of the housing body, wherein said first side wall faces said base side of the respective holding frame wherein the cell elements have electric contact elements at their longitudinal ends, wherein the electric contact elements of mutually adjacent cell elements are each connected electrically to one another by a busbar, and wherein each busbar is held directly by a respective one of the holding frames.

* * * * *